United States Patent [19]
d'Hont et al.

[11] Patent Number: 6,064,320
[45] Date of Patent: May 16, 2000

[54] AUTOMATIC VEHICLE IDENTIFICATION SYSTEM CAPABLE OF VEHICLE LANE DISCRIMINATION

[75] Inventors: Loek d'Hont, Garland, Tex.; Anne Tip, Het Welpelo, Netherlands

[73] Assignee: Texas Instruments Incorporated, Dallas, Tex.

[21] Appl. No.: 09/054,952

[22] Filed: Apr. 3, 1998

Related U.S. Application Data

[60] Provisional application No. 60/041,945, Apr. 4, 1997.

[51] Int. Cl.$^7$ ..................................................... G08G 1/01

[52] U.S. Cl. ..................... 340/933; 340/928; 340/825.54; 342/42; 342/51; 455/47

[58] Field of Search ..................................... 340/928, 933, 340/825.54, 825.34; 342/42, 44, 51; 455/46, 47

[56] References Cited

U.S. PATENT DOCUMENTS

| | | | |
|---|---|---|---|
| 4,739,328 | 4/1988 | Koelle et al. | 342/44 |
| 5,471,212 | 11/1995 | Sharpe et al. | 342/51 |
| 5,485,520 | 1/1996 | Chaum et al. | 380/24 |
| 5,701,127 | 12/1997 | Sharpe | 342/42 |
| 5,809,142 | 9/1998 | Hurta et al. | 380/24 |
| 5,828,693 | 10/1998 | Mays et al. | 375/202 |

*Primary Examiner*—Daniel J. Wu
*Attorney, Agent, or Firm*—Rebecca Mapstone Lake; Richard L. Donaldson

[57] ABSTRACT

A system of vehicle identification with a first interrogator that uses a Lower SideBand (LSB) receiver to receive a modulated signal from a vehicle transponder and a second interrogator that uses an Upper SideBand (USB) receiver to receive another modulated signal. The two interrogators are adjacent to each other at a toll plaza, and operate at different carrier frequencies to force a signal frequency bandgap between communication signals in adjacent vehicle lanes.

6 Claims, 3 Drawing Sheets

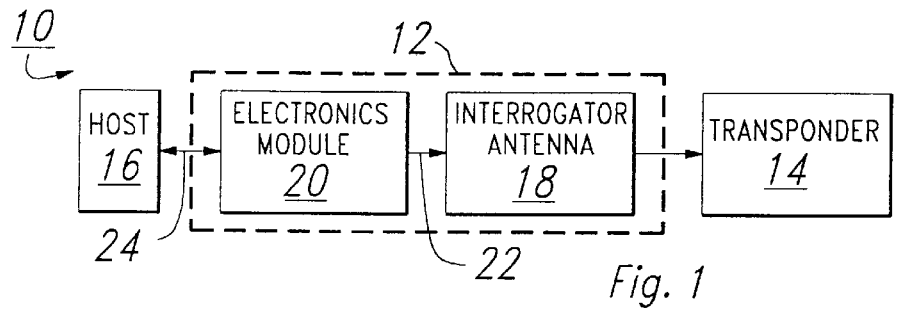
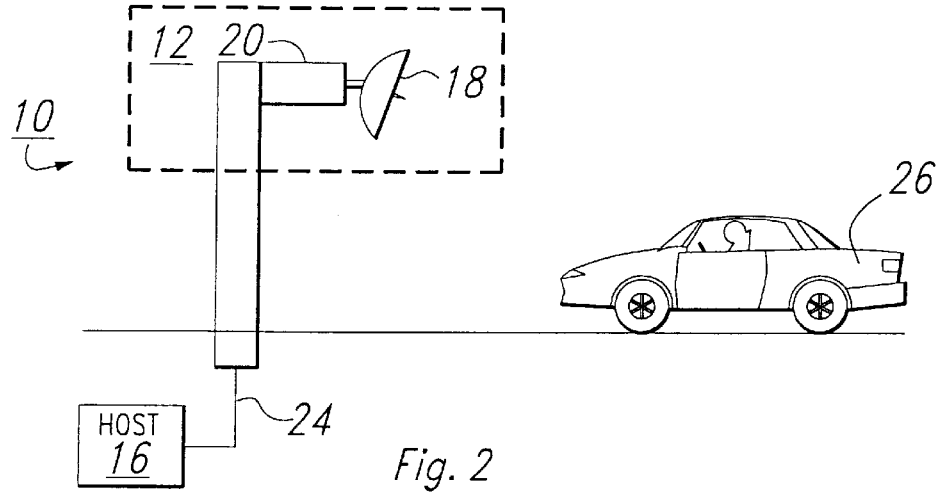
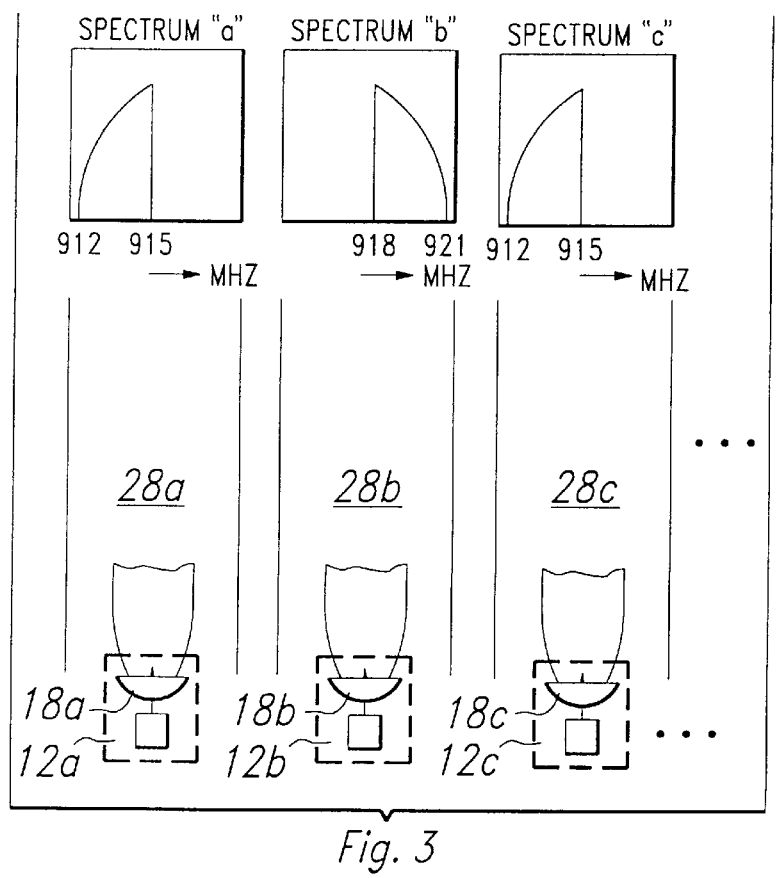

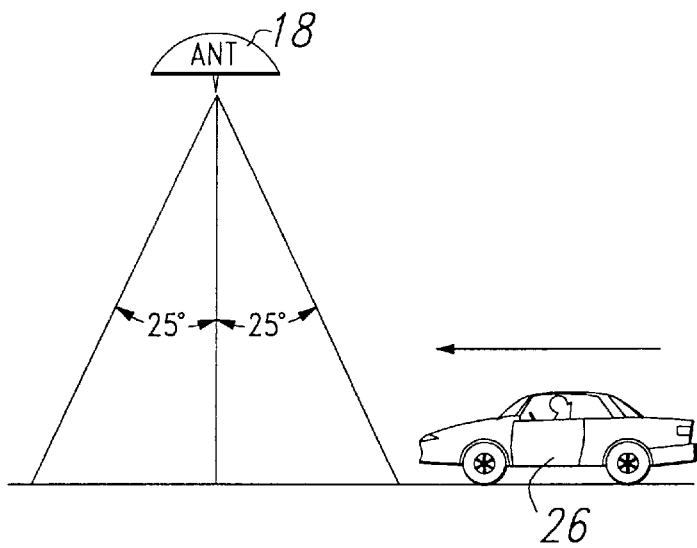
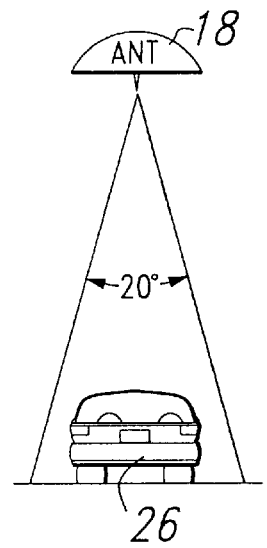
Fig. 6a
Fig. 6b
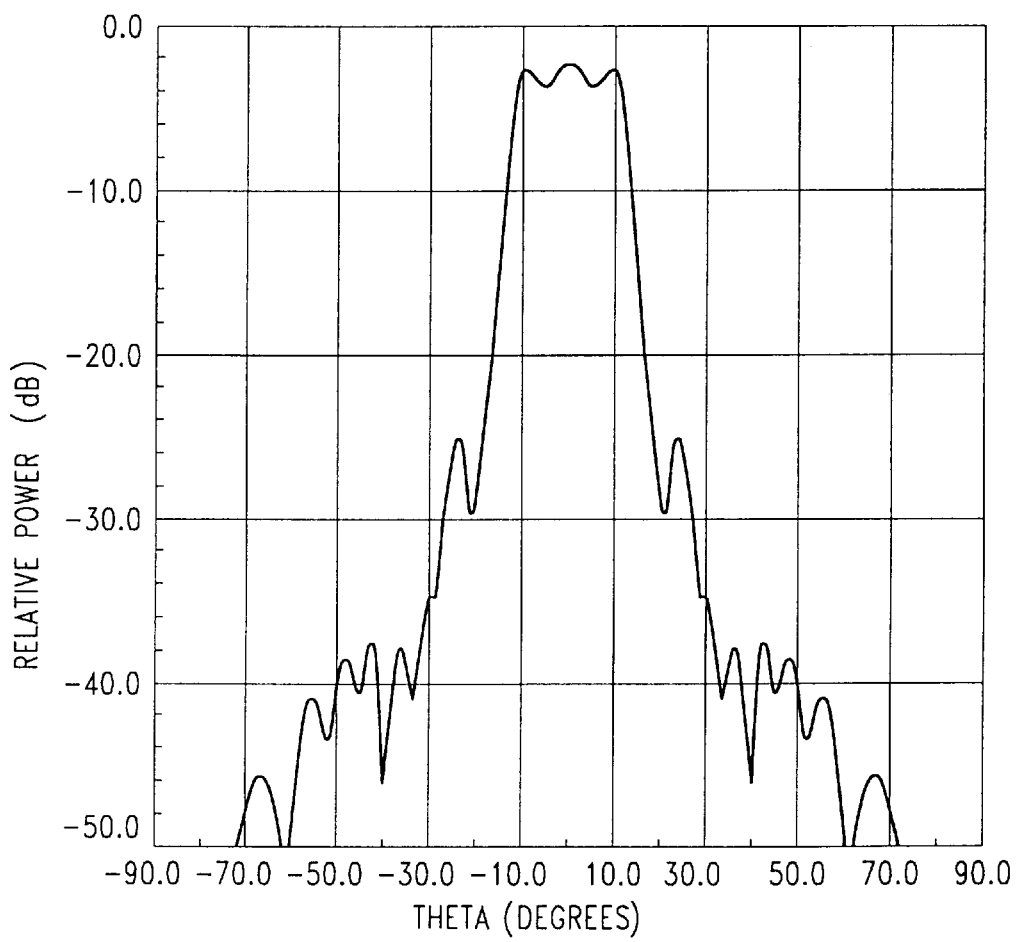
Fig. 7

AUTOMATIC VEHICLE IDENTIFICATION SYSTEM CAPABLE OF VEHICLE LANE DISCRIMINATION

This application claims priority under 35 USC §119 (e) (1) of provisional application No. 60/041,945 filed Apr. 4, 1997.

CROSS-REFERENCE TO RELATED PATENTS

The following commonly-assigned patent applications are hereby incorporated by reference:

| Pat No./Serial No. | Filing Date | TI Case No. |
| --- | --- | --- |
| 08/021,123 | 2/23/93 | TI-17529 |
| 5,471,212 | 4/26/94 | TI-18205 |

FIELD OF THE INVENTION

This invention generally relates to a transponder arrangement in which an interrogator or reader unit communicates with a remote tag or transponder. Particularly, a plurality of interrogators focus directional antennas on selected areas in which a transponder may be located. Transponders in one of these selected areas will respond to the interrogator associated with the area in which it is found.

BACKGROUND OF THE INVENTION

Without limiting the scope of the invention, the invention will be described in the context of an Automatic Vehicle Identification (AVI) system capable of vehicle lane discrimination. When adjacent highways lanes are close together, and, interrogators associated with the adjacent highway vehicle lanes are correspondingly close, it becomes difficult to maintain signal separation between the receivers of the respective interrogators.

SUMMARY OF THE INVENTION

In the preferred embodiment of the present invention the system is an Automatic Vehicle Identification (AVI) system capable of vehicle lane discrimination. In automatic toll booth systems employing RF data links for vehicular identification, it may be necessary for readers or interrogators to limit their communications to transponders in a specific lane upon which an antenna in electrical communication with the interrogator is associated. Within the vehicle is a tag or a transponder which receives the interrogation signal from the transmitter of the interrogator or reader whose antenna is focused upon the lane in which the vehicle is travelling. The transponder can reply to the interrogator focused on the transponder-bearing vehicle's lane by backscatter modulating a continuous wave (CW) input that preferably is received from the associated interrogator. The receiver of the interrogator then decodes the backscatter-modulated signal and may relay the information contained in this signal to a control circuit which, for example, might log the information into a memory. An analogous principle to the backscatter modulation of a CW signal is that of an LCD wristwatch which sends the wearer data based on reflected light.

The difficulty is that an entire toll plaza communication system will normally have a fixed frequency spectrum associated with it, such that all communications by the AVI system must be effected within a limited bandwidth. When the adjacent highways lanes are close together, and the associated interrogator antennas are correspondingly close, it becomes difficult to maintain signal separation between the receivers of the respective interrogators. This problem is exacerbated by the fact that to operate the AVI system with maximum communication bandwidth, adjacent prior art interrogators would use as much of the available bandwidth as possible, such that the frequency spectra occupied by adjacent communication links will be exactly overlapping. The prior art has attempted to address this problem by use of alternating signal carrier frequencies between adjacent vehicle lanes. This invention is the first to recognize the advantage of using non-identical communications schemes in conjunction with the alternating communication frequencies on adjacent vehicle lanes to increase the frequency separation between the adjacent communications links. By adjacent communication links operating at substantially non-overlapping frequency spectra, the amount of signal cross-talk between adjacent interrogators is greatly reduced.

BRIEF DESCRIPTION OF THE DRAWINGS

In the drawings:

FIG. 1 is a block circuit diagram of the preferred embodiment Automatic Vehicle Identification (AVI) System;

FIG. 2 is a side view of a typical installation of the preferred embodiment AVI System;

FIG. 3a is a top view of three adjacent lanes using the preferred embodiment AVI System, the ellipses indicate that the method can be extended to greater than three lanes;

FIG. 3b shows the modulation spectra employed in the three adjacent lanes of FIG. 3a;

FIG. 6 is an overview of the dimensions of the interrogator antenna field pattern; and FIG. 7 is a field pattern of the preferred embodiment interrogator antenna.

Corresponding numerals and symbols in the different figures refer to corresponding parts unless otherwise indicated.

DETAILED DESCRIPTION OF PREFERRED EMBODIMENTS

Figure 4:
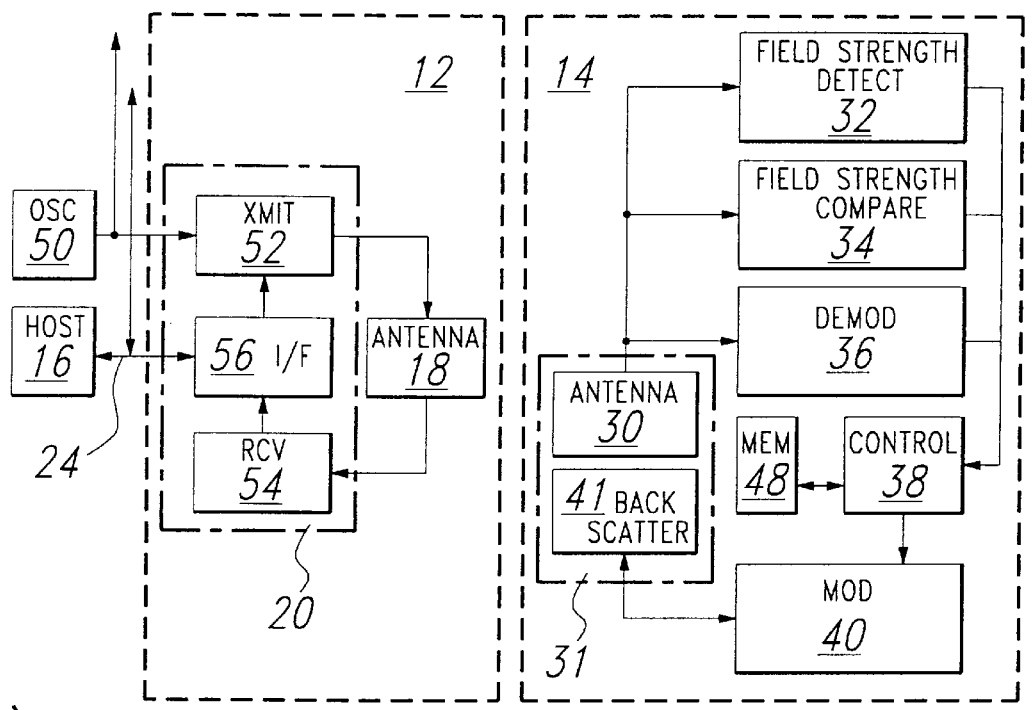
FIG. 4 is a block circuit diagram of the preferred embodiment AVI System showing block circuit diagrams of the interrogator and the transponder.

A block diagram of the preferred embodiment AVI system 10 is shown in FIG. 1. This system includes an interrogator 12, a transponder 14, and preferably a toll plaza computer 16. Preferably, one interrogator 12 is provided for each lane in which an RF data link is to be maintained. Except internal electrical parameters which may or may not be the same, all interrogators 12 are identical. Such internal electrical parameters comprise of: interrogator lane position, control parameters, and reference frequency. The role of the interrogator 12 in this application is: to trigger or activate a transponder 14, to poll the transponder 14 for specific information, and to acknowledge to the transponder 14 that a valid data exchange has taken place. As shown in FIG. 2, the interrogator 12 has an antenna 18, which is preferably a patch antenna (microstrip antenna) 18, but could be a slotted wave guide antenna, or any type of antenna according to engineering design parameters. The antenna is preferably mounted approximately 18 feet above the roadway. Preferably, the antenna 18 will have linear polarization, but advantages may exist which will motivate the use of other choices of polarization including circular and elliptical. The interrogator electronics 20 are connected to this antenna 18 by suitable cable, such as for example an RF coax 22. The interrogator 12 communicates in a wireless fashion with the transponder 14 by sending on/off keying modulated signals to the transponder 14. interrogator 12 then sends a continuous wave RF signal to the transponder 14. The transponder 14 may respond to the interrogator 12 by backscatter modulating the continuous wave signal such as described in U.S. Pat. No. 4,739,328 by Koelle, et al. Details of the communication between the interrogator 12 and the transponder 14 will be further described herein. Connection 24 between the interrogator 12 and a toll plaza computer 16 as shown in FIG. 1 may be an RS232 or RS422 connection, either connection being well known in the art of computer interconnection.

Figure 5:
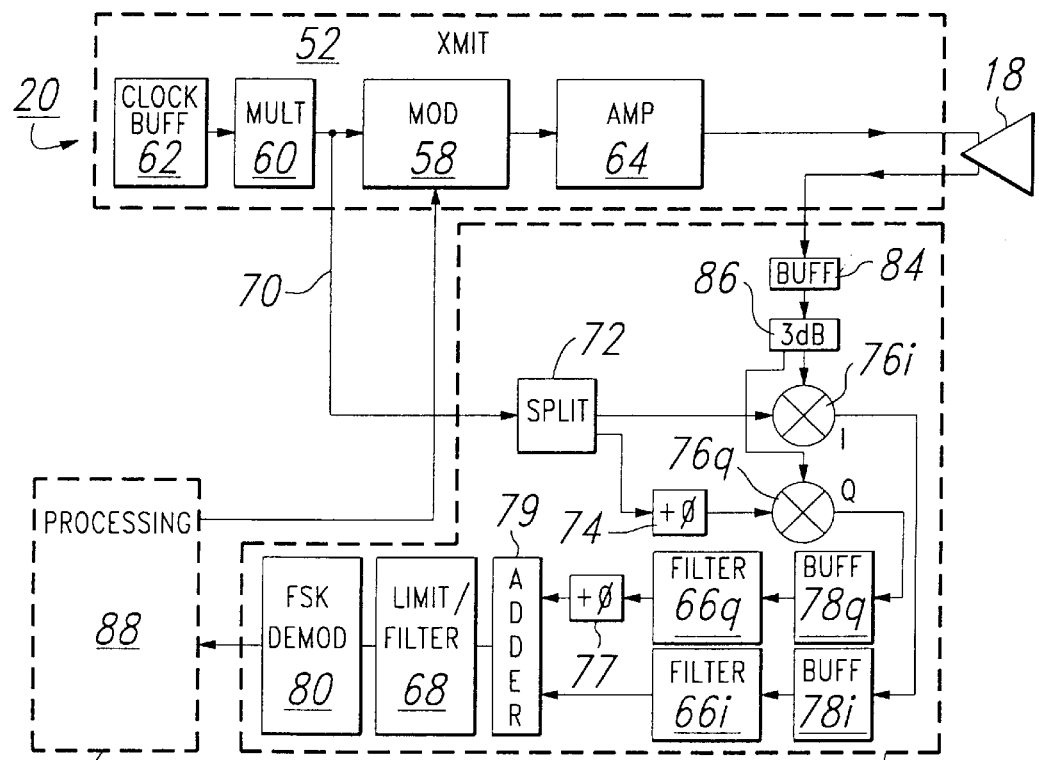
FIG. 5 is a more detailed block circuit diagram of the interrogator of the preferred embodiment.

The interrogator 12 of FIG. 1 is housed in two modules: the electronics module 20 and the antenna 18. As shown in FIG. 5, the electronics module 20 contains the transmitter 52 and the receiver 54 and the control circuit 56. The module 20 may be designed to operate in a controlled environment, making use of appropriate heating and forced air cooling to comply with the temperature extremes which may be encountered. The antenna module 18 typically consists of the antenna and any appropriate control electronics which may be required. The interconnection between the antenna 18 and the electronics module 20 consists of a low-loss RF interconnect 22, which is typically a coaxial cable and a multiconductor cable capable of supplying power and control signal information. The antenna 18 is preferably weatherproof but not temperature-controlled.

FIG. 2 shows a side view of a typical AVI system 10 installation. In this figure a vehicle 26 travels on a vehicle lane and approaches the interrogator 12. A transponder 14 is located on or within a vehicle 26. Preferably the transponder 14 is mounted to the vehicle front window. In certain applications such as in unusually large vehicles other locations might be appropriate. As shown in the figure, the vehicle 26 carrying the transponder 14 approaches the interrogator 12 at the toll plaza. Further details regarding the communication between the transponder 14 and the interrogator 12 will be discussed herein. The components of this system will also be discussed in greater detail.

FIG. 3 is a top view of an AVI system 10 comprising three lanes. The method described herein could be used advantageously in any AVI system having two or more lanes. Three lanes are shown merely for illustration purposes. FIG. 4 provides a block diagram of the major components of the AVI system 10. Firstly, the preferred embodiment transponder 14 will be described with reference to FIG. 4 together with FIGS. 2 and 3. The AVI system 10 is capable of vehicle lane discrimination and has directional antennas, each antenna 18a,18b,18c focused on an associated vehicle lane 28a,28b,28c. A vehicle 26 or vehicles may travel on each lane, each vehicle 26 carrying a remote transponder 14. Each transponder 14 preferably comprises: an antenna 30, a field strength detector 32, a field strength comparator 34, a field demodulator 36, a transponder control circuit 38, a backscatter modulator 40, and a modulated reflector 41.

With further reference to FIGS. 3 and 4, the transponder antenna 30 is operable to receive RF transmissions from the interrogator 12. The field strength detector 32 converts a signal supplied by the transponder antenna 30 to a voltage which upon exceeding a threshold activates the transponder 14. According to one embodiment the threshold for activation is 500 mV/m$^2$±0.8 dB, however it is anticipated that system designs can be accomplished while maintaining a wider threshold for activation. Activation preferably occurs quickly after receiving this signal level to maximize the amount of time available for communication. The adjacent interrogators 12a,12b,12c preferably discriminate in which of the associated vehicle lanes 28a,28b,28c the transponder 14 is located. A system and method for performing this discrimination is described in commonly-assigned patent application Ser. No. 08/021,123, filed Apr. 23, 1993, incorporated by reference herein. The results of the lane discrimination are preferably related to the transponder 14 so that the transponder may then respond only to messages from the appropriate interrogator 12 (i.e., the interrogator associated with the lane in which the transponder 14 is travelling). A transponder field demodulator 36 is then operable to demodulate a downlink message (which in the preferred embodiment is amplitude demodulated) from the appropriate interrogator 12. The transponder control circuit 38 receives the demodulated downlink message and then may take appropriate action or store the message in a memory 48. With direction from the control circuit 38, the transponder backscatter modulator 40 is then operable to backscatter modulate a continuous wave signal sent by the interrogator 12 to generate an uplink message via a modulated reflector. Preferably, a transponder memory 48 is provided which the control circuit 38 can access to provide data to the backscatter modulator 40 for transmission. In the described embodiment, memory 48 is a read/write non-volatile memory having a capacity of at least 2K bytes, however, it is anticipated that volatile memory and read-only memory (ROM) could be used and that memories having a lesser capacity than 2K could be implemented in an AVI system 10 or in other systems.

The transponder modulator 40 shown in the figure accepts the data stream from the control circuit 38 and modulates the reflectivity or radar cross section (RCS) of the modulated reflector 41 in a controlled manner. Modulated reflector 41 is modulated by changing its apparent wave length, preferably between one fourth and one half the carrier wave length. The transponder electronics assemblies typically are self-contained on a small credit card size assembly which is completely portable. Preferably an internal battery is provided to give operating power to the transponder 14. Alternatively the transponder 14 might gain its operating power directly from the RF signal. Although the modulated reflector 41 is described as a separate element from the transponder antenna 30, it is possible for both elements to be integrated into a single integrated antenna 31.

Now that the components of the transponder 14 have been described, with further reference to FIG. 4 together with FIG. 3, the preferred embodiment interrogator 12 will be described. The interrogator 12 is located at a toll plaza. Each interrogator 12 has a directional antenna 18 and a transmitter 52 which transmit a wake-up burst 42 which is of sufficient field strength at a pre-selected distance to trigger a transponder 14 being carried in a vehicle 26 in the interrogator's associated vehicle lane 28a,28b,28c. The interrogator 12 then transmits a downlink message to the remote transponder 14, the downlink message preferably being transmitted using On-Off Keying. Upon completion of the downlink message, the transmitter 52 then transmits a continuous wave illumination signal onto the transponder 14 so the transponder 14 may backscatter modulate the continuous wave illumination signal to generate the uplink message. The interrogator 12 further includes a receiver 54 for reception of the uplink message and for separation of the uplink message from spurious non-modulated reflections. The interrogator transmitter 52 and receiver 54 operate under control of a control circuit 56. Control circuit 56 directs the transmitter 52 to send the wake-up burst 42, followed by the downlink message.

As the transmitters 52 of adjacent interrogators 12a,12b, 12c send their continuous-wave illumination signal, a problem arises in that the receivers 54 of the respective interrogators will receive interference from neighboring interrogators. For example, interrogator 12b is likely to receive interfering backscatter signals that originated from the CW illumination of its neighboring interrogators 12a, 12c. A first line of defense to prevent this interference between neighboring interrogators 12a,12b,12c is to alternative each interrogator's respective illumination frequency. For example, interrogator 12a might have an illumination frequency of 915 MHz (see FIG. 3b, SPECTRUM "a"), interrogator 12b might have an illumination frequency of 918 MHz (FIG. 3b, SPECTRUM "b"), and interrogator 12c might have an illumination frequency of 915 MHz (FIG. 3b, SPECTRUM "c"). In this way, for example, if the modulation scheme employed is one of single-sideband demodulation (SSB), and the lower sideband is always used (Lower SideBand [LSB] demodulation) by the respective interrogator receiver 54, the receiver passbands will be: interrogator 12a—912–915 MHz (see FIG. 3b, SPECTRUM "a"); interrogator 12b—915–918 MHz (FIG. 3b, SPECTRUM "b"); and interrogator 12c—912–915 MHz (FIG. 3b, SPECTRUM "c"). For interrogators 12a and 12c the demodulation scheme will pose no great difficulty, because the 918 MHz illumination carrier associated with interrogator 12b is well-removed from their receiver passbands of 912–915 MHz. For interrogator 12b, however, the 915 MHz illumination carrier associated with its neighbors (interrogators 12a,12b) will pose a great risk of drowning out the backscatter-modulated return signals from a transponder 14 travelling in interrogator 12b's associated vehicle lane 28b, since these 915 MHz illumination carriers will operate right at the edge of interrogator 12b's receiver passband of 915–918 MHz.

In the preferred embodiment of the present invention, this problem is overcome by setting up the interrogator illumination carrier/receiver scheme as follows:

Lane 1: 915 MHz: LSB receiver
Lane 2: 918 MHz: USB receiver
Lane 3: 915 MHz: LSB receiver
Lane 4: 918 MHz: USB receiver And so on in cases of more than 4 lanes.

The system by which the sidebands of neighboring interrogators 12 will be alternated will depend upon which of the different schemes of SSB demodulation is employed. Different techniques for sideband demodulation are known in the art. For example, each interrogator 12 might have a bandpass filter 84 (see FIG. 5), the characteristics of this bandpass filter 84 may be tailored to the desired frequency spectrum of the particular carrier/sideband combination received in the interrogator's lane. Thus, interrogator 12a would have a bandpass filter 84 that would ideally pass only received signals between 912 and 915 MHz, interrogator 12b would have a bandpass filter 84 that would pass the frequencies between 915 and 918 MHz, interrogator 12c would have a bandpass filter 84 that would pass the 912–915 spectrum, and so on. More ideally, the alternating single-sideband signal demodulation approach can be accomplished by alternating the I and Q demodulation paths between adjacent interrogators. The I/Q demodulation scheme is described more fully hereinbelow, but it will be touched on briefly here.

Referring to FIG. 5, the incidence signal from the antenna 18 is first provided to the mixers 76i,76q from the dual-port antenna 18. Alternatively, a single-port antenna could be used in conjunction with a circulator 82 (not shown, see FIG. 5 of 08/021,123, which is incorporated by reference herein), which makes the connection to the alternative embodiment single-port antenna 18 full duplex, such that the single-port antenna can radiate signals from the transmitter 52 and to receive signals to pass on to the receiver 54. In either case, the signal from mixers 76i,76q then passes through a bandpass filter 84 and is split between I/Q mixers 76i,76q using a 3 dB coupler 86. The signal from these mixers typically then passes through a buffer, a bandpass filter, and a limiter before being passed on to the I/Q demodulator 80 for reconstruction of the baseband signal. The baseband signal, which contains FSK-encoded digital information, is then extensively filtered and limited, before being passed on to be demodulated by the FSK demodulator 81. The FSK demodulator 81 may be analog or digital, and may or may not be included in the processing circuitry 88. The I/Q method is well known in the art and is described, for instance, in FERREL G. STREMLER, INTRODUCTION TO COMMUNICATION SYSTEMS 254–67 (2d ed. 1982). By alternating which path is treated by the I/Q digital FSK decoder as the "I" and which is treated as the "Q" (for exarnple, the signal path coming through the "i" designated elements 76i,78i,66i could be treated by the decoder as either the "I" signal or the "Q" signal), whether the decoder acts as an upper or a lower-sideband decoder can be alternated. See STREMLER, supra at 240–51, which is hereby incorporated herein by reference. Again, the I/Q approach is merely a practical example; the same can be achieved by using a sideband filter to pass either the LSB or the USB, after which follows a product detector 80 to recover the baseband signal.

In addition to the alternating sidebands used in demodulating the backscatter-modulated uplink signal from transponders 14 to the interrogators 12, the same alternating sideband approach may be used for the downlink signal from the interrogators 12 to the transponders 14, even though such signals are, in the preferred embodiment, manchester-encoded amplitude modulation signals. While one would generate this downlink signal as a single-sideband signal with the carrier still in place, the tag would see exactly the same signal in the time-domain as long as the remaining sideband amplitude is increased by 3 dB; however in the frequency domain, one sideband of the Manchester-encoded AM downlink signal would be suppressed at least 30 dB in that case, using an image-reject mixer. This suppression might be even greater if a sideband filter were used instead of an image-reject mixer. By such an approach, lane interference might be reduced even further by using an alternating USB-LSB for the interrogator 12 to transponder 14 downlink as well.

The advantage gained by using the alternating USB-LSB for the downlink can be used to suppress out-of-band noise, which would allow for a larger frequency separation, and still be within a specified frequency spectrum (such as dictated by FCC spectrum allocation constraints). The advantage may also be used to let the interrogators 12 run interference-free without the need for all interrogation cycles to begin at exactly the same moment to avoid collision between uplink and downlink signals between adjacent lanes 18. In prior approaches, it was necessary to have all lanes interrogated simultaneously to avoid a situation in which the transponder 14 is sending its relatively weak uplink signal to a first interrogator 12b in a first vehicle lane 18b at the same time that a second interrogator 12a or 12c is sending a stronger downlink signal in an adjacent lane 18a or 18c. In this prior approach, the stronger downlink signal would likely interfere with the weak uplink signal from the transponder 14.

Now that the major components of the transponder 14 have been described in some detail, the electronic components 20 of the interrogator 12 will be described in more detail with respect to FIG. 5. The electronics 20 comprise a transmitter 52 which is operable to send signals to the antenna 18. Typically transmitter 52 receives signals from the toll plaza computer 16 via the host connection 24. During the transponder reply the transmitter 52 illuminates the transponder 14 with a constant RF signal which the transponder 14 then backscatter modulates with the reply data. The receiver 54 detects the reflected energy which is backscatter modulated by the transponder 14 and separates the modulated signal from the non-modulated reflections. Antenna 18, shown here in electrical communication with the transmitter 52 and the receiver 54, is a directional antenna 18 with a precisely shaped pattern and is used to illuminate a portion of each lane during the data exchange between the toll plaza and the vehicle 26. In the described embodiment, a single antenna 18 is used for both the downlink message and the uplink message. The antenna 18 is typically mounted overhead and is positioned to ensure a constant link between the interrogator 12 and the transponder 14 regardless of site dependent variations. Also shown is the control circuit or host computer interface 56 used to communicate with a toll plaza computer 16 which would control all the interrogators 12 at a single toll plaza. The computer interface 56 between the interrogator 12 and the toll plaza computer 16 accepts information from the toll plaza computer 16 via the host connection 24 and formats the data for transmission to the vehicle 26 by means of the transmitter 52. The computer interface 56 also decodes the reply data from the transponder 14 by means of the receiver 54 and supplies this reply data to the toll plaza computer 16. Typically, except for the antenna 18, the components of the interrogator 12 are located in a weatherproof, temperature-controlled environment. The antenna 18 is weatherproof and is designed to operate over the anticipated temperature extremes in its environment.

The receiver 54 of the interrogator 12 detects the backscatter-modulated return signal from the transponder 14. The amplitude and phase of the return signal will be dependent upon the multitude of reflections which occur from a number of sources. Undesired sources of return include the following: vehicles 26 in the same lane as the interrogator 12 creating beamfilling or non-beamfilling unmodulated returns; vehicles 26 in adjacent lanes 28a,28b, 28c creating unmodulated and backscatter modulated returns; fixed obstacles of unknown composition creating unmodulated returns; and leakage from the transmitter 52 to the receiver 54 during illumination of the transponder 14.

The signals may be extracted from the modulated return signal using a homodyne I/Q approach. For this application a local oscillator signal 70 (L.O.) is provided from the same frequency multiplier 60 which excites the transmitter 52. From this signal is derived two outputs that are 90 degrees out of phase. These signals, known as the "in phase" or "I" clock and the "quadrature" or "Q" clock are provided by using a buffer 72 and a phase shifter 74. The "I" and "Q" signals are generated by providing the I/Q clocks to two mixers 76i,76q which mixes the signals with a half-power portion of the received signals. Among other things the receiver 54 will receive 915 MHz carrier leakage signal and 915 MHz target reflections. Since the incident phase of these received signals is not known, the I/Q approach must be used to separate the desired, coherent signals from the many reflections and leakage signals having unknown phase and amplitude. The information in the backscatter modulated return signal is contained on synchronous AM side bands, therefore the local oscillator 70 frequency must be phase synchronous with the original backscatter carrier. Since the phase of these signals is not known, the I/Q demodulation is provided to allow for all combinations of incident phase. From the mixers 76i,76q, the "I" and "Q" signals then pass through buffers 78i,78q, and bandpass filters 66i,66q. The output of bandpass filter 66q is then phase shifted by 90 degrees, and added to the output of filter 66i at adder 79. From adder 79 the resulting baseband signal is then limited and filtered by limit/filter 68 and passed on to an FSK demodulator 80 for reconstruction. The I/Q method of extracting a baseband coherent signal from a noisy environment is well known in the art and is described, for instance, in STREMLER, supra at 254–67. This signal first passes through a bandpass filter 84 and is split between I/Q mixers 76i,76q using a 3-dB coupler 86. The signal from these mixers typically then passes through a buffer, a bandpass filter, and a limiter before being passed on to the I/Q digital FSK decoder 80 for reconstruction. The desired base band signal is preferably a frequency shift keying (FSK) signal which, for example, would use a 600 kHz signal for a space (or "0") and a 1200 kHz for a mark (or "1") with a 300 kHz bit frequency. The information contained in the transponder 14 has now been superimposed onto the illumination signal from the transmitter 52, detected by the receiver 54 of the interrogator 12 and is sent to a control circuit 56 which includes decoding and demodulation circuitry 80.

FIGS. 6a and 6b show the antenna geometry pattern for the preferred-embodiment antenna 18. As previously mentioned, this antenna 18 is preferably a patch antenna (microstrip antenna) 18, but could be a directional, slotted waveguide antenna 18, or another type of antenna according to design needs. The antenna 18 preferably has a very steep shape factor as shown in FIG. 8 to provide a rapid loss in field strength as the antenna pattern approaches adjacent lanes. Antenna 18 will typically have a beamwidth (3 dB) of 50 degrees in the vertical plane as shown in FIG. 6a and will typically have a beamwidth (3 dB) of 20 degrees in the horizontal plane as shown in FIG. 6b. The horizontal beamwidth is positioned to just coincide with the width of the highway. The vertical beamwidth is used to illuminate a particular length of highway. In the described embodiment, the antenna 18 is about 12 feet in width, and as previously mentioned, has linear polarization. However, circular polarization might be used. Alternatively, elliptical polarization might provide some advantage in certain environments.

FIG. 7 shows an antenna field pattern for the described-embodiment antenna. The antenna 18 of this embodiment uses a specially weighted aperture which results in a much steeper rate of rolloff of the field strength. This allows a sharper definition of the lane edges.

The sole table below comprises the terms used in this patent application, including some alternate and preferred terms. Other terms may be used which are not listed in the sole table.

TABLE

| Drawing Element | Generic Term | Preferred or Specific Term | Alternate Terms |
|---|---|---|---|
| 10 | Vehicle Identification System | Automatic Vehicle Identification System | AVI System |
| 12, 12a, 12b, 12c | Reader | Interrogator | |
| 14 | Transponder | Transponder | Responder, Tag |
| 16 | Host Computer | Toll Plaza Computer | Toll Booth Computer |

TABLE-continued

| Drawing Element | Generic Term | Preferred or Specific Term | Alternate Terms |
|---|---|---|---|
| 18, 18a, 18b, 18c | Antenna | Directional Antenna | Interrogator Antenna |
| 20 | Electronics Module | Interrogator Electronics Module | |
| 22 | Interconnect | RF Interconnect | RF coax, Coaxial Cable |
| 24 | Connection | Host Connection | RS232 Connection, RS422 Connection |
| 26 | Vehicle | Vehicle | Automobile |
| 28, 28a, 28b, 28c | Lane | Vehicle Lane | |
| 30 | Antenna | Transponder Antenna | Tag Antenna, Responder Antenna |
| 31 | Integrated Antenna | Integrated Transponder Antenna | Integrated Transponder Reflector/Antenna |
| 32 | Detector | Field Strength Detector | |
| 34 | Comparator | Field Strength Comparator | |
| 36 | Demodulator | Field Strength Demodulator | |
| 38 | Control Circuit | Transponder Control Circuit | |
| 40 | Modulator | Backscatter Modulator | Transponder Modulator |
| 41 | Reflector | Modulated Reflector | |
| 42 | Wake-up Burst | Wake-up Burst | Activation Signal |
| 48 | Memory | Transponder Memory | |
| 50 | Reference Oscillator | Common Reference Oscillator | Reference Generator |
| 51 | Output | Output of Reference Oscillator | |
| 52 | Transmitter | Transmitter | Illuminator, Transmitter Module |
| 54 | Receiver | Receiver | Receiver Module, Demodulator |
| 56 | Control Circuit | Interface Circuit | |
| 58 | Modulator | | |
| 60 | Clock Frequency Multiplier | | |
| 62 | Buffer | Clock Buffer | |
| 64 | Amplifier | Power Amplifier | |
| 66i, 66q | Filter | Bandpass Filter | |
| 68 | Limit/Filter | | |
| 72 | Signal Splitter | Buffer | |
| 74 | Phase Shifter | 90° Phase Shifter | |
| 76i, 76q | Mixer | | |
| 77 | Phase Shifter | 90° Phase Shifter | |
| 78i, 78q | Buffer | | |
| 79 | Adder | | |
| 80 | Demodulator | FSK Demod | |
| 82 | Circulator | | |
| 84 | Buffer | | |
| 86 | Signal Splitter | 3-dB Coupler | |
| 88 | Processing Circuitry | | |

A few preferred embodiments have been described in detail hereinabove. It is to be understood that the scope of the invention also comprehends embodiments different from those described, yet within the scope of the claims.

For example, display devices can be cathode ray tubes or other raster-scanned devices, liquid crystal displays, or plasma displays. "Microcomputer" in some contexts is used to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Frequency shift keying (FSK) modulation is envisioned as a possible data modulation scheme, as well as pulse-pause modulation, amplitude shift keying (ASK), quadrature AM (QAM) modulation, quadrature phase shift keying (QPSK), or any other modulation. Different types of multiplexing such as time or frequency modulation might be effected to avoid cross-signal interference. Modulation might be effected by back-scatter modulation, by active modulation of a carrier, or by another method. Discrete components or fully integrated circuits in silicon (Si), gallium arsenide (GaAs), or other electronic materials families, as well as in optical-based or other technology-based forms and embodiments might be used to implement the circuits described herein. It should be understood that various embodiments of the invention can employ or be embodied in hardware, software or microcoded firmware.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The claimed invention provides many advantages over prior approaches. For example, the claimed system provides for reduced inter-lane interference between interrogators for a given communication bandwidth. The interrogators in adjacent lanes operate at different frequencies, thus lowering the possibility of crossreads between adjacent interrogators. The system described herein can be operated in a narrow FCC band for AVI without the need for expensive class-A amplifiers in the Power Amplifier (PA). When using the alternating sideband method for the downlink from the interrogator to the transponder, the interrogators can run without event-synchronization of their interrogation modes. In other words, it is no longer necessary to ensure that no interrogators are transmitting a downlink signal to the transponders at the same time that the transponders are attempting to transmit uplink signals to an interrogator. This further eliminates the need for a daisy-chained signal wire between interrogators to maintain this event synchronization.

What is claimed is:

1. A system of vehicle identification comprising:
   a) a first interrogator, said first interrogator having a Lower SideBand (LSB) receiver for receiving a first modulated signal from a first vehicle transponder, said first interrogator further having a first demodulator operable to extract a first demodulated signal from the LSB of said first modulated signal; and b) a second interrogator, said second interrogator having an Upper SideBand (USB) receiver for receiving a second modulated signal from a second vehicle transponder, said second interrogator having a second demodulator operable to extract a second demodulated signal from the USB of said second modulated signal.

2. The system of claim 1 wherein said first modulated signal has a carrier of a first frequency and said second modulated signal has a carrier of a second frequency.

3. The system of claim 2 wherein said first frequency is less than said second frequency.

4. The system of claim 1 and further comprising a third interrogator, which has a LSB receiver, said third interrogator being positioned adjacent to said second interrogator such that said second interrogator is horizontally adjacent to said first and third interrogators and positioned therebetween.

5. A system of vehicle identification comprising:

a) a first interrogator, said first interrogator having a Lower SideBand (LSB) receiver for receiving a first modulated signal from a first vehicle transponder, said first interrogator having a first demodulator operable to extract a first demodulated signal from the LSB of said first modulated signal, said first interrogator further comprising a first sideband transmitter; and b) a second interrogator, said second interrogator having an Upper SideBand (USB) receiver for receiving a second modulated signal from a second vehicle transponder, said second interrogator having a second demodulator operable to extract a second demodulated signal from the USB of said second modulated signal, said second interrogator further comprising a second sideband transmitter, said second sideband transmitter employing the opposite sideband as was employed by the first sideband transmitter.

6. The system of claim 5 wherein said first transmitter is an LSB transmitter, and said second transmitter is a USB transmitter.

* * * * *